March 4, 1924. 1,485,690
R. MESTARS
AUDIBLE THEFT SIGNAL FOR AUTOMOBILES
Original Filed Oct. 27, 1919   3 Sheets-Sheet 1
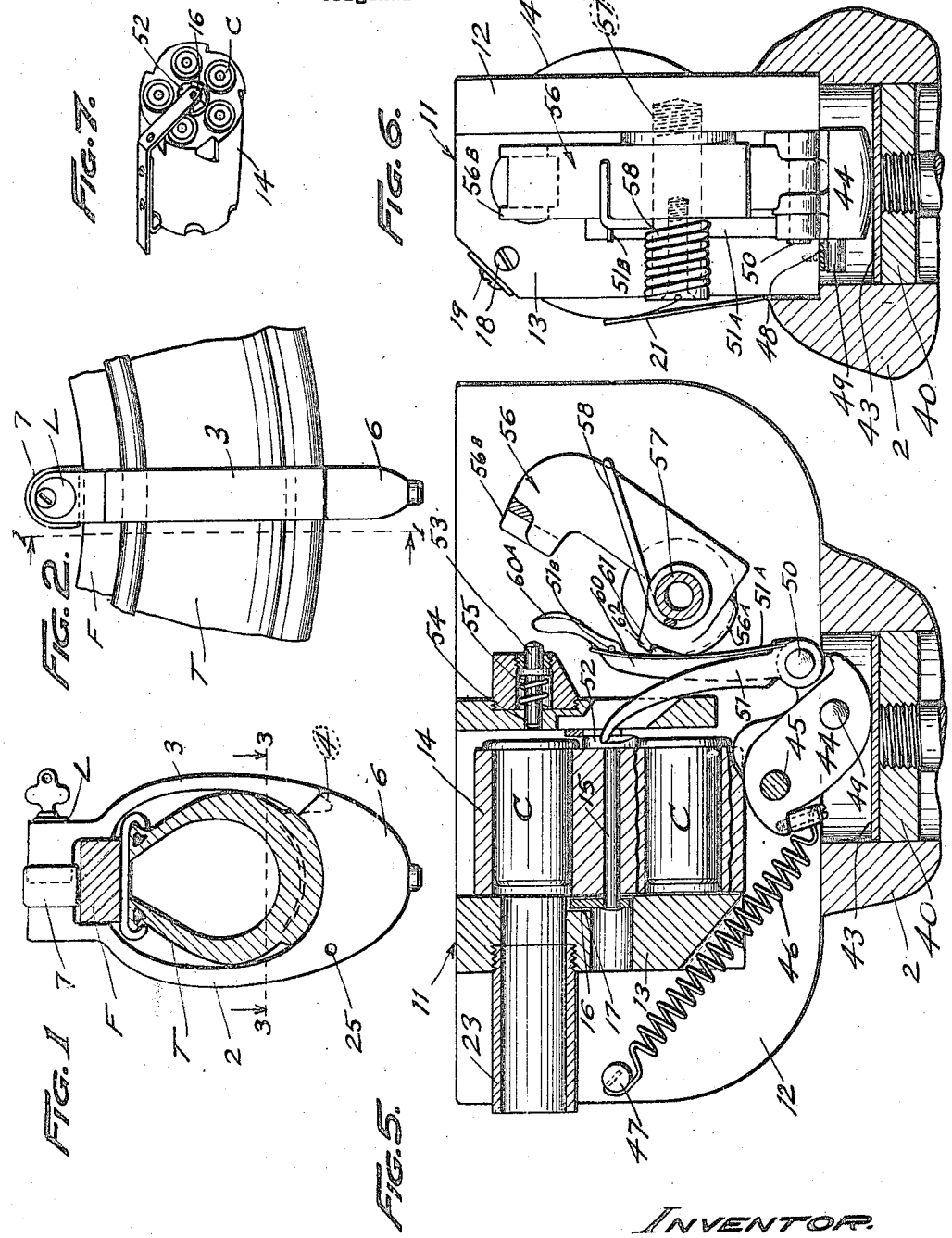
INVENTOR.
ROBERT MESTARS.
BY Hazard & Miller
ATTORNEYS.

March 4, 1924.

R. MESTARS 1,485,690

AUDIBLE THEFT SIGNAL FOR AUTOMOBILES

Original Filed Oct. 27, 1919  3 Sheets-Sheet 2

INVENTOR.
ROBERT MESTARS.
By Hazard & Miller
ATTORNEYS.

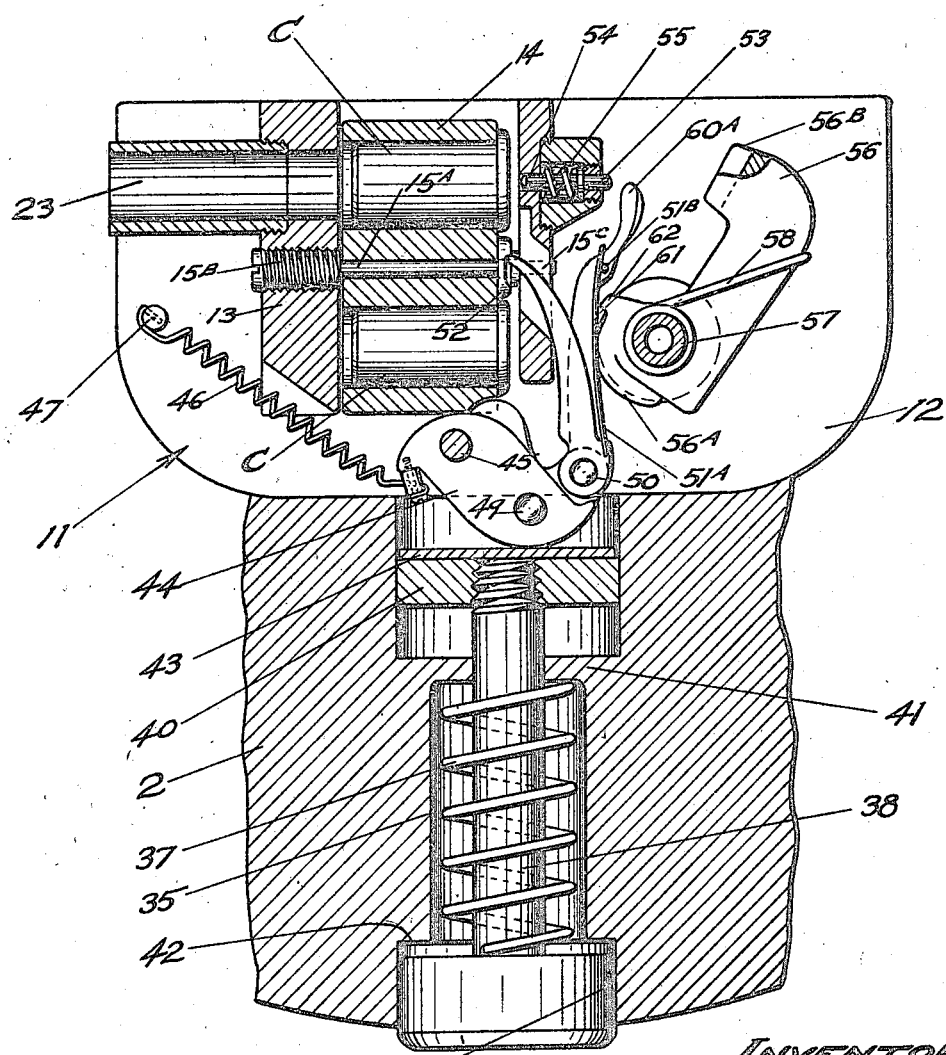

Patented Mar. 4, 1924.

1,485,690

UNITED STATES PATENT OFFICE.

ROBERT MESTARS, OF LOS ANGELES, CALIFORNIA, ASSIGNOR TO SECURITY MANUFACTURING COMPANY, OF LOS ANGELES, CALIFORNIA, A CORPORATION OF CALIFORNIA.

AUDIBLE THEFT SIGNAL FOR AUTOMOBILES.

Application filed October 27, 1919, Serial No. 333,700. Renewed January 8, 1924.

*To all whom it may concern:*

Be it known that I, ROBERT MESTARS, a citizen of the United States, residing at Los Angeles, in the county of Los Angeles and State of California, have invented new and useful Improvements in Audible Theft Signals for Automobiles, of which the following is a specification.

This invention relates to signal devices and more particularly to an audible signal device adapted to be readily applied to and detached from vehicle wheels.

It is an object of the present invention to improve an audible theft alarm for vehicles.

With the above and other objects in view as will be rendered manifest to those versed in the art, the invention consists of the construction, the combination, and in details and arrangements of the parts as more particularly set forth hereinafter relative to the embodiment of the invention illustrated in the accompanying drawings, wherein;

Figure 1 is a cross section taken on line 1—1 of Fig. 2 showing a type of automobile theft indicator in which my invention is embodied.

Fig. 2 shows an edge view of the same as applied to a portion of a vehicle tire and wheel felly.

Fig. 5 is an enlarged detail view partially in section of the gun mechanism with the parts shown in position ready to fire a cartridge.

Fig. 6 is an end view of the structure shown in Fig. 5, parts being in section.

Fig. 7 is a perspective view of the cartridge cylinder and its carrier detached from the gun frame.

Fig. 8 is a detail sectional view similar to Fig. 5 but showing a modified form of mounting for the cartridge cylinder.

Figure 3:
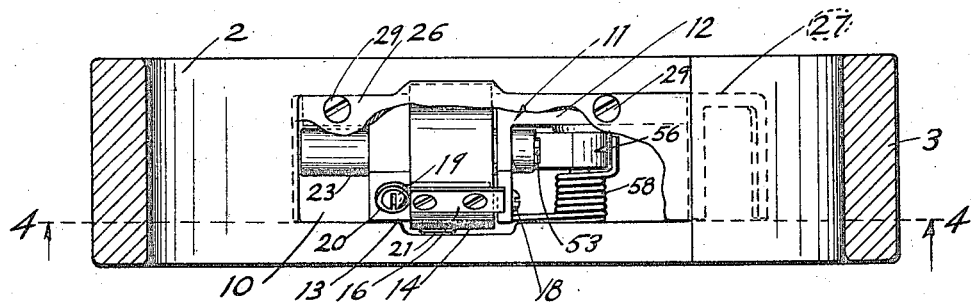
Fig. 3 is a cross sectional view on an enlarged scale taken on the line 3—3 of Fig. 1.

In this embodiment of my invention the signal alarm comprises a substantially loop-shaped body member 2 having a separable side member 3 provided with an interlocking tongue 4 designed to enter a keeper 5 provided therefor at one side of the projecting point 6 of the loop which point is designed to extend across the periphery of an automobile tire as T in Fig. 2 and thus form a means for scoring or marking the roadway or surface over which the wheel of the vehicle will travel when the vehicle is driven, and the signal device is attached to the wheel.

The removable side member 3 of the signal device may be provided for interlocking connection with a complementary part 7 of the loop which is designed to assume a position in the rear of the usual felly F of a wheel, and the portion 3 may be securely locked in place by any suitable type of lock generally designated at L and for which may be a removable key if desired. From this it will be seen when the signal loop or device is applied while the removable side 3 is out the latter can then be properly assembled with the main body of the device and locked thereto until it is desired to drive the vehicle when the authorized person will insert the key or in other manner actuate the lock to permit the removal of the signal device.

One of the features of my present invention is to provide a device of this kind with means for giving an audible signal and preferably incorporate means for causing the explosion of one of a series of cartridges that may be mounted in a magazine previously to the installation of the magazine in the discharging mechanism to be described hereinafter more fully.

Figure 4:
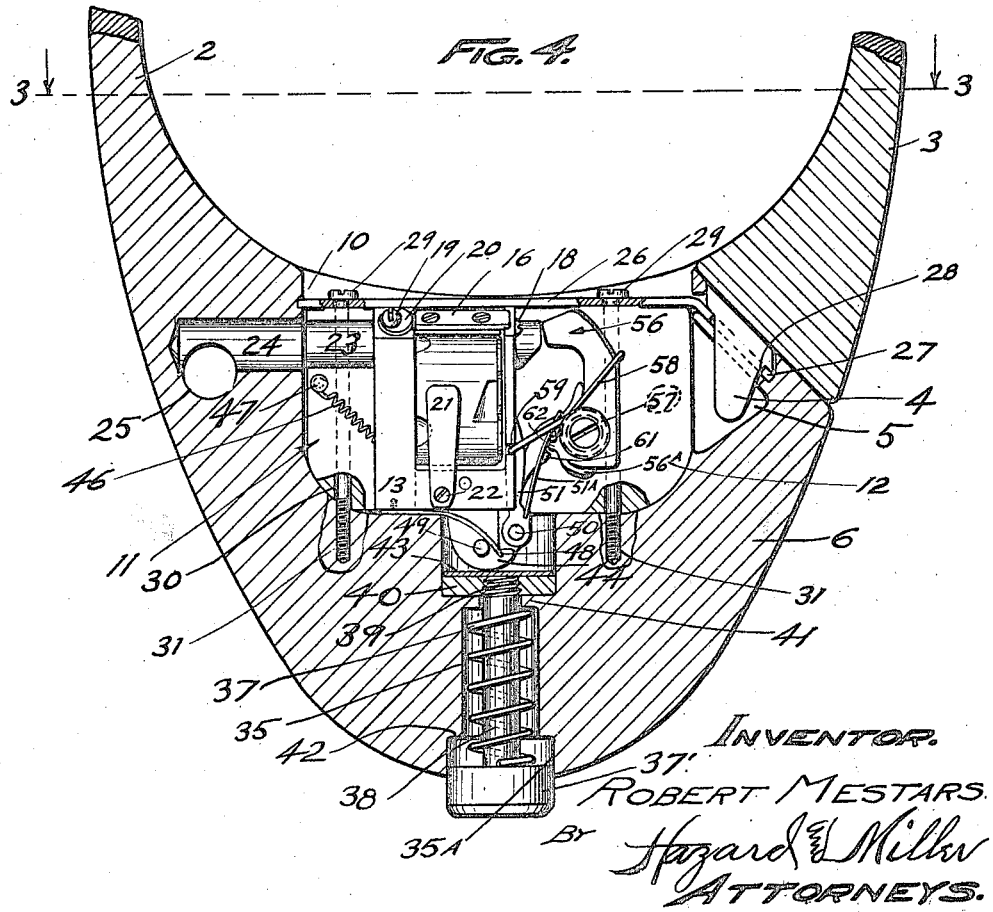
Fig. 4 is a section substantially on the line 4—4 of Fig. 3 showing parts of the mechanism in elevation.

It is desirable to provide an extremely compact form of cartridge firing mechanism so that the same can be substantially fully inclosed or housed within the main body portion 6 of the signal device, and to that end this body portion is shown as provided with a chamber 10 opening upwardly into the tire receiving opening within the loop side members and into this chamber there is designed to be inserted a readily removable firing mechanism which is shown in detail in Figs. 4, 5 and 6 and comprises a frame 11 having a side or panel portion 12 of suitable length and height to have a snug fit in the pocket or chamber 10, and which further is provided with a laterally projecting side portion 13 forming a housing for a cartridge carrier or cylinder 14 which serves as a magazine for the cartridges C to be exploded, as hereinafter described.

This cylinder is provided with a shaft or supporting rod 15, the ends of which are mounted in a yoke or carrying device 16 clearly shown in Fig. 7 as of substantially a U-shape and is adapted to be readily inserted into or withdrawn from a guideway in the form of channels 17 provided therefor in the adjacent faces of the frame portion 13. This enables the ready removal of the gun cylinder 14 from its pocket in the frame 13 for loading and reloading as may be required. For the purpose of securing the cylinder carrier 16 in its assembled position in the frame portion 13, there is provided a screw 18 in Figs. 4 and 6 passing through one side of the frame 13 and designed to enter the upper portion of the carrier 16 and to further secure the latter in its inserted position another screw 19 is threaded in the other side of the frame 13 and this is designed to clamp down upon a loose and eccentrically mounted clamping washer 20 designed to be thrown around to the position shown in Fig. 4 to extend over and engage the adjacent portion at the upper end of the cylinder carrier 16.

For the purpose of frictionally controlling the rotation of the cartridge cylinder 14 a suitable brake in the form of a leaf spring 21 may be pivotally mounted as on a screw 22 to bear upon the side of the cylinder as shown in Fig. 4; the leaf spring being capable of swinging movement about its pivot or fulcrum 22 to permit ready removal of the cylinder.

At one side of the frame 13 there is provided a tubular extension or barrel part 23 through which the gases, produced by the explosion of a charge, can be directed into an outlet port formed in the body portion 6, this port being indicated at 24 partly alining with the axis of the barrel 23 and is extended transversely thereto at 25 so as to divert the exploding gases to the front or rear of the automobile signal device 2 instead of directly to the side thereof and thus to avoid possible injury to pedestrians, or near by persons, or objects.

For the purpose of preventing the unwarranted removal of the gun mechanism from the chamber 10 when the device may be wholly detached from the vehicle wheel, I utilize a removable retaining plate 26 extending substantially across and covering the upper portion of the gun action or mechanism; this plate having at one end a downwardly turned portion 27 complementary to the projecting portion 4 which latter passes through an aperture 28 in the part 27, so that the user of the device has but to assemble the removable piece 3 by inserting the lug 4 in its proper keeper and lock the parts together. The whole organization of the gun mechanism and the keeper plate 26 may be effectually maintained in inserted position in the pocket 10 through means of a pair of screws 29 of sufficient length to pass through the plate 26 and through apertures 30 provided in the side wall or panel portion 12 of the frame and enter tapped holes 31 provided therein in the bottom of the pocket or chamber 10.

To secure the discharge of one of the cartridges in the cylinder 14, the lower and road engaging end of the signal device body 6 is provided with a substantially central bore 35 in which is mounted a compression spring 37 bearing against the head 37' on the end of a plunger or stem 38, the upper end of which is threaded at 39 to receive a nut 40 which plays above a stop shoulder 41 formed at the inner end of the spring chamber 35; the spring 37 reacting against one surface of the shoulder 41 to press the plunger 38 outwardly a sufficient distance, so that when it is pressed into an enlarged portion 35$^a$ of the chamber it will, by its inner movement, cause the discharge of the cartridge through a mechanism about to be described.

The inner movement of the plunger head 38 is limited by engagement with a suitable stop or shoulder 42 forming the base of the enlargement 35$^a$ of the chamber. Obviously the nut 40 on the upper or inner end of the stem 38 limits the outward movement of the plunger. Preferably right above the nut 40 there is introduced a loose wearing plate or washer 43.

This washer is designed to engage, upon the inward movement of the plunger 38, against a trigger 44 which is mounted on a pivot 45 (Fig. 5) on the casing frame 12, this trigger being normally thrown downwardly or outwardly toward the driving plunger through means of a spring 46, one end of which is connected suitably to the trigger 44 and the other to a convenient portion as a pin 47 on the side plate 12 of the frame. If desired a further and supplemental spring may be utilized to retract the lever or trigger 44 such spring being indicated clearly in Fig. 4 in the form of a leaf 48 normally standing outwardly at its free end and being fastened to the bottom of the side frame 13 so as to engage a shoulder or pin 49 outstanding from the side of the trigger 44; the supplemental spring 48 only coming into play as the trigger with the pin 49 is moved well toward the bottom of the casing 13 as in the position indicated in Fig. 5. It will be observed that the pivot of the trigger 44 is offset well to one side of the axis of the plunger 38 so that the contacting portion of the trigger which bears upon the wear plate or washer 43 will readily operate in response to pressure from the inwardly moving plunger.

The trigger 44 is provided at its swinging end with a pivot pin or fulcrum 50 on which there is suitably mounted a pawl 51 extending upwardly and turned inwardly at its free end to engage a ratchet wheel 52 of the usual type provided for the purpose of rotating the cartridge cylinder 14 simultaneously with the initial movement of the trigger 44 so as to bring a fresh cartridge in the cylinder 14 into the path of a firing pin 53 which is yieldingly mounted in a suitable bearing 54, the pin alining with the percussion cap of the cartridge to be fired. The pawl 51 is automatically thrown inwardly into yielding engagement with the ratchet 52 on the cylinder 14 by means of a suitable spring 51$^a$, one end of which is mounted adjacent the hub of the pawl 51 and the outer end of which reacts against a support in the form of a pin 51$^b$ mounted on a part 60, to be hereinafter described, so that the single spring serves to actuate both the pawl and the part 60.

To secure the normal retraction of the firing pin 53 from the caps of the cartridges any suitable device as a spring 55 is incorporated. In its retracted position one end of the firing pin projects from the bearing part 54 and this is designed to be projected to the firing position through the instrumentality of an appropriate hammer 56 mounted on a suitable pivot or support on the side plate 12 of the frame; the hammer being normally thrown into the position shown in Fig. 4 through the medium of a main spring 58 having one arm reacting on the hammer and the other arm suitably attached to a fixed part of the gun frame as at 59 in Fig. 4.

To secure the cocking and tripping of the hammer by the action of the trigger 44, a sear or other suitable cocking member is shown at 60, the sear having pivotal support as on the pivot or stud 50 and extending upwardly therefrom so that a shoulder 61 on one side of the sear 60 will in its upward movement engage an abutment or complementary shoulder 62 and thus throw the hammer to the position shown in Fig. 5 when the plunger is moving inwardly as indicated by the arrow. Further upward movement of the sear 60 results in additional rotation of the hammer about its pivot 57, so that a cam portion 56$^a$ on the hub of the hammer wipes against the adjacent surface of the sear 60, and this latter is thrown from interlock with the shoulder 62 of the hammer hub whereupon the hammer is released and thrown by its spring 58 toward the firing pin 53. At this moment there is interposed between the head of the hammer 56 and the firing pin 53 a striking part 60$^a$ of the sear 60 and this causes the blow of the hammer to be transmitted to the striking pin 53 and the latter is then driven inwardly and causes the discharge of the cartridge registered therewith.

As it is desirable to permit the automatic retraction of the firing pin 53, as soon as the sear 60 is withdrawn by the springs 46 and 48 upon the outward movement of the plunger 38 so as to allow the free actuation of the cartridge cylinder 14, the striking head of the hammer 56 is shown as rebated or grooved at 56$^b$ and into this recess the firing pin 53 will be projected as the filler or striking portion 60$^a$ of the sear 60 is withdrawn.

From the above it will be seen that the operation of this device is substantially as follows: A person desiring to leave a standing auotmobile simply arranges the open sided body portion of the loop or member 2 around one side of the felly and tire in such a position that the traction or road engaging portion 6 of the device will overlap the tire and then closes the side member 3 so as to interlock the same with the transverse portion 7, and then so manipulates the lock L as to prevent the ready removal of the device until the proper opening of the lock is achieved. After the device has been so applied, should a person try to drive away the vehicle, rotation of the wheel to which the device is applied will cause the body member 6 to move downwardly toward the roadway or surface and ultimately bring the plunger head 37 into contact with the ground and cause the plunger 38 to be moved inwardly a limited distance as determined by the shoulder 42 by which movement the trigger 44 would have been thrown about its pivot 45 and cause the tripping of the hammer 56 and the firing of the cartridge 14. Should the wheel make a plurality of revolutions after the first cartridge is exploded the remaining or other cartridges of those remaining would be exploded and this would obviously attract attention to the fact that an unwarranted removal of the vehicle was being attempted.

In Fig. 8 the cylinder 14 instead of being mounted, as in Fig. 5, so as to be detached with the carrier 20 has its shaft or pivot 15$^a$ provided with threads 15$^b$ at one end to take into a threaded portion of the frame 13 whilst the opposite end of the pivot 15$^a$ is mounted in the frame wall as at 15$^c$.

Various changes may be made without departing from the spirt of my invention as claimed.

I claim:

1. An audible signal device for indicating the attempted theft of wheeled vehicles, comprising a member adapted to be encircled about the tire and felly of a wheel of the vehicle and having a movable part to permit such arrangement, and means for locking the device in place on the wheel; said member having a main body portion projecting outwardly from the periphery of the tire and provided with a chamber; a gun mechanism compactly constructed and arranged to be bodily inserted in and removed from the said chamber; and means for interlocking with the movable part of the said member to prevent the removal of the gun mechanism unless the movable part is disconnected therefrom.

2. An audible signal device for indicating the attempted theft of wheeled vehicles, comprising a member adapted to be encircled about the tire and felly of a wheel of the vehicle and having a movable part to permit such arrangement, and means for locking the device in place on the wheel; said member having a main body portion projecting outwardly from the periphery of the tire and provided with a chamber; a gun mechanism compactly constructed and arranged to be bodily inserted in and removed from the said chamber; and means for interlocking with the movable part of the said member to prevent the removal of the gun mechanism unless the movable part is disconnected therefrom, and fastening means for securing the gun mechanism and the said means in the chamber.

3. An audible automobile theft signal comprising, in combination, a device substantially in the form of a loop adapted to be encircled about a tire and felly of a wheel of the vehicle, said device having a movable part to permit such arrangement, the body portion of the said device chambered to receive a cartridge firing mechanism; the said firing mechanism arranged in said chamber; and a cover plate for said mechanism; and interlocking means between said cover plate and the movable part of said device to prevent the removal, without breakage, of the gun mechanism before said part is disconnected from the cover plate and said signal is removed from the said wheel.

4. An audible signal for vehicle wheels to indicate the attempted theft of a vehicle on which the wheel is arranged, comprising a device adapted to be locked in place about the tire and the felly of the wheel said device having a chambered body portion having a yielding plunger projecting from its surface engaging part; means for limiting the inward and outward movement of the plunger; a gun action arranged in the said chamber and bodily removable therefrom; the said gun action being operable by the inward movement of the plunger to discharge a cartridge in the gun action.

5. An audible signal for vehicle wheels to indicate the attempted theft of a vehicle on which the wheel is arranged, comprising a device adapted to be locked in place about the tire and the felly of the wheel said device having a chambered body portion having a guided yielding plunger projecting from its surface engaging part; means for limiting the inward and outward movement of the plunger; a gun action arranged in the said chamber and bodily removable therefrom; the said gun action being operable by the inward movement of the plunger to discharge a cartridge in the gun action.

6. An audible theft indicating signal comprising, a device adapted to be locked about the tire and felly of a wheel of the vehicle and having a body portion projecting from the periphery of the tire and which portion is chambered; a compactly organized gun action designed to be readily mounted and secured in the said chamber, said action having a trigger member; the body portion of the said device having a bore extending to its road engaging face and provided with a series of shoulders forming stops; and a yielding plunger mounted in the said bore and engaging one of said stops upon the rim of its inward movement during which movement the plunger actuates the gun trigger; and a device on the plunger for engaging the other of the stops to limit the outward movement of the plunger.

7. An automobile theft signal comprising a frame having a chamber, a cylinder to carry cartridges, and a carrier upon which the cylinder is rotatably mounted and which carrier is adapted to be readily inserted into the frame or removed therefrom to permit the loading and reloading of the cylinders; means for locking the cylinder carrier in position in the chamber of the frame and a cartridge firing mechanism arranged on the frame so as to be bodily movable therewith, said mechanism including a trigger and a cylinder rotating device and hammer operable by the trigger; and a plunger operable by movement in one direction to actuate the trigger and secure the discharge of a cartridge in the cylinder, and a casing in which aforesaid parts are mounted said casing being adapted for attachment to the tire and felly of a vehicle so that when the wheel is rotated the plunger will be brought into contact with a roadway and thereby operated.

8. An automobile theft signal comprising a device adapted to be encircled around the tire and felly of a wheel thereof and having a movable side part lockable in closing position; a cartridge firing mechanism bodily insertible into the body portion of the device and having a removable cylinder for cartridges; and a yielding plunger mounted in the ground engaging portions of the device and operative, when pressed inwardly, to actuate said mechanism to effect the discharge of a cartridge.

9. An auto theft signal comprising a device adapted to be encircled around the tire and felly of a wheel thereof and having a movable side part lockable in closing position; a cartridge firing mechanism bodily insertible into the body portion of the device and having a removable cylinder for cartridges; and a yielding plunger mounted in the ground engaging portions of the device and operative, when pressed inwardly to actuate said mechanism to effect the discharge of a cartridge, and a cover plate for the said mechanism and interlocking with the said side part.

10. An automobile theft alarm including a frame, means for locking said frame about a felly, rim and tire of an automobile wheel, a gun action mounted in said frame for firing a plurality of cartridges, and a plunger mounted in said frame for engaging the ground and actuating said gun action to fire said cartridges successively if the automobile is driven with said frame locked on the automobile wheel.

11. An audible signal for vehicle wheels to indicate the attempted theft of a vehicle on which the wheel is arranged, comprising a device adapted to be locked in place about the tire and the felly of the wheel, said device having a chambered body portion having a yielding plunger projecting from its surface engaging part; means for limiting the outward movement of the plunger; a cartridge firing mechanism arranged in said chamber; the said cartridge firing mechanism being brought into action by the inward movement of the plunger to discharge a cartridge.

12. An audible signal for vehicle wheels to indicate the attempted theft of a vehicle on which the wheel is arranged, comprising a device adapted to be locked in place about the tire and the felly of the wheel, said device having a chambered body portion having a guided yielding plunger projecting from its surface engaging part; means for limiting the outward movement of the plunger; a cartridge firing mechanism arranged in the said chamber, the said cartridge firing mechanism being brought into action by the inward movement of the plunger to discharge a cartridge.

13. An anti-theft signal comprising sound producing means, means for securing said sound producing means in position upon a vehicle wheel, and means for actuating said sound producing means upon the rotation of the wheel; said securing means comprising a pair of attachable members, and means for locking said members to the wheel; and said actuating means comprising a normally extended reciprocatory controller adapted to be pressed inwardly upon engagement with the roadway, and means of operative connection with the sound producing means actuated upon the inward movement of the controller.

14. An anti-theft signal comprising sound producing mechanism, means for locking said sound reproducing mechanism to a vehicle wheel, a plunger so placed as to strike the ground as the wheel is revolved, and means by which said plunger actuates said mechanism.

15. An anti-theft signal comprising mechanism adapted when actuated to produce sound, means for securing said sound producing mechanism to a vehicle wheel, and means so situated as to strike the ground and thus to actuate said mechanism upon rotation of the wheel.

In testimony whereof I have signed my name to this specification.

ROBERT MESTARS.